United States Patent [19]

Cochran, Jr. et al.

[11] Patent Number: 4,478,301

[45] Date of Patent: Oct. 23, 1984

[54] APPARATUS FOR CONTROLLING THE FILLING OF WEIGH PANS

[75] Inventors: John M. Cochran, Jr.; Ronald N. Cleveland, both of Greenville, S.C.

[73] Assignee: Frontier Electronics, Inc., Greenville, S.C.

[21] Appl. No.: 450,105

[22] Filed: Dec. 15, 1982

[51] Int. Cl.³ .................... G01G 19/22; G01G 13/18; G01G 23/02

[52] U.S. Cl. .................................. 177/70; 177/105; 177/157

[58] Field of Search .............. 177/70, 105, 106, 113, 177/157

[56] References Cited

U.S. PATENT DOCUMENTS 3,132,709  5/1964  Lytton ................................ 177/114
4,310,060  1/1982  Phillips, Jr. et al. .................. 177/70

Primary Examiner—George H. Miller, Jr.
Attorney, Agent, or Firm—Julian W. Dority

[57] ABSTRACT

An apparatus for selecting between a mechanical or electrical mode for controlling the flow of fibers by motor driven feed lift aprons from a plurality of hoppers to a plurality of weigh pans for producing a predetermined blend of fibers. The mechanical mode utilizes a balance arm assembly which can be set to feed a predetermined amount of fibers into a weigh pan. The electrical mode utilizes thumbwheel switches which can be set for regulating the amount of fibers to be fed into each weigh pan. The electrical mode system also utilizes a comparator for comparing a signal representing the actual weight of fibers in the weigh pan that is produced by a load cell with a signal representing the desired weight of fibers produced by the thumbwheel switches and generates a control signal responsive thereto. The control signal is used for operating a motor driven feed lift apron associated with the hopper.

4 Claims, 4 Drawing Figures

APPARATUS FOR CONTROLLING THE FILLING OF WEIGH PANS

BACKGROUND OF THE INVENTION

In normal blending operations, fibers are fed by means of lift aprons from hoppers into weigh pans. The weigh pans are equipped with balance arm assemblies which are used for measuring the weight of fibers being deposited into the weigh pan and for stopping the feeding of fibers into the weigh pan upon a predetermined weight being deposited therein. After all of the hoppers have received a predetermined weight of fibers therein, doors associated with the weigh pans are opened allowing the fibers from the plurality of weigh pans to be deposited on a conveyor belt to form the desired blend.

One particular apparatus for feeding textile fibers in a uniform stream is disclosed in U.S. Pat. No. 3,132,709. As can be seen therein, the weigh bar assembly is used for setting the desired weight of fibers that are to be deposited in a particular weigh pan. Upon the desired weight being deposited in the weigh pan, and electric switch is activated, de-energizing the motor associated with the hopper feed lift apron. The device disclosed in this particular patent is normally referred to as a mechanical device for weighing the fibers being deposited into weigh pans even though an electrical switch is used in combination with a weigh bar assembly for contolling the operation of the motor driven feed lift apron.

In order to monitor and provide a record of the fibers that are dropped by weigh pans onto a belt in order to determine the blend of the fibers, electronic monitoring systems have been utilized. One electronic monitoring system is disclosed in U.S. Pat. No. 4,310,060. In this particular device, load cells are carried between the hopper and the weigh pan for generating electrical signals indicating the weight of the fibers that is fed into the weigh pan. These signals are, in turn, converted from analog signals to digital signals and displayed on a digital display. Similar signals are also fed to a chart recorder for making a permanent record of the individual drops of fibers made by the weigh pan.

Apparently there have been many other attempts to solve the problem of monitoring the flow of fibers from a plurality of hoppers to a conveyor in order to control the blend, however, most of them have not been made commercially available. One such device is disclosed in U.S. Pat. No. 3,918,538.

There have been other attempts to control the flow of fibers to a weigh pan, however, to applicant's knowledge, no one has provided a system for selectively switching from a mechanical weighing system such as shown in U.S. Pat. No. 3,132,709 to an electronic weighing and controlling system in a simple manner without adversely affecting the operation of the mechanical weighing systems.

SUMMARY OF THE INVENTION

The apparatus constructed in accordance with the present invention makes available an apparatus which is simple and reliable for either mechanically or electrically controlling the filling of weigh pans and a method for selectively switching from one system to the other.

In the apparatus constructed in accordance with the present invention, the flow of fibers are fed by a motor driven feed lift apron from a plurality of hoppers to a plurality of weigh pans for producing a predetermined blend of fibers. A balance arm assembly is used for mechanically setting a predetermined weight of fibers to be fed from a respective hopper to a respective weigh pan. The apparatus is also provided with a load cell for electrically monitoring the respective dumps of fibers from the weigh pans onto a blending conveyor.

A rotatably mounted crank arm is carried adjacent the balance arm assembly for physically locking the balance arm assembly in an inoperative position when rotated to a first position. A switch means is activated by the rotatably mounted crank arm for selectively activating an electrical system for controlling the flow of fibers to the weigh pans by selectively turning on and off the motor driven lift apron. Once the desired weight of each dump of fibers by the particular weigh pan is determined, this information is set for that particular weigh pan by manipulating thumbwheel switches or the like to indicate the desired weight. A comparator means is used for comparing the signal produced by the thumbwheel switches corresponding to the desired weight of fibers that are to be fed into a weigh pan with a signal produced by the load cell corresponding to the actual weight of fibers in the weigh pan. The comparator means generates a control signal responsive thereto. This control signal is, in turn, used for energizing the motor driven feed apron for controlling the filling of fibers into the weigh pan.

The weight of the dumps of fibers onto the conveyor are also recorded in the same manner as described in U.S. Pat. No. 4,310,060.

Accordingly, it is an important object of the present invention to provide an apparatus which can be readily changed from mechanically to electrically controlling the flow of fibers from a hopper to a weigh pan.

Another important object of the present invention is to provide a simple and reliable system for either mechanically or electrically filling weigh pans and for selectively switching between the two control systems.

Another important object of the present invention is to provide an apparatus for converting mechanically controlled fiber filling systems associated with weigh pans to an electrically controlled system and vice versa without destroying or interfering with the integrity of the mechanically controlled system.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

DESCRIPTION OF A PREFERRED EMBODIMENT

Figure 1:
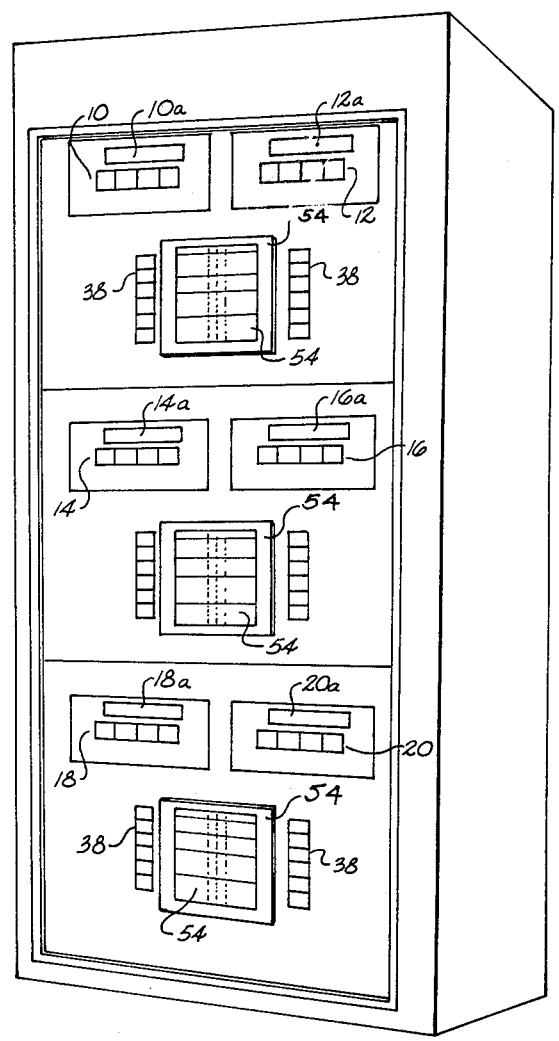
FIG. 1 is a perspective view illustrating a console for housing an apparatus constructed in accordance with the present invention.

Referring to FIG. 1 there is illustrated a control panel for the circuitry used in controlling and monitoring filling of fibers into a plurality of weigh pans which, upon being filled to a predetermined weight, drops the fibers onto a receiver. Positioned on the front of the control panel are switches 10, 12, 14, 16 18, and 20 which can be set to visually indicate the desired weight of fibers that is to be filled in a respective weigh pan. The actual weight of the fibers in a respective weigh pan is indicated in the panels 10a, 12a, etc. Each of the weigh pans 22, 24, 26, 28, 30, and 32 have individual selection switches 10 through 20 which may take the form of thumbwheel switches that are used for controlling the amount of fibers that are to be filled from the respective hoppers. After all of the weigh pans 22 through 32 have been filled with the desired amount of fibers, the fibers are dumped onto a receiving conveyor belt 36. The operation of the dumping mechanism is described in more detail in U.S. Pat. No. 3,132,709.

Other indicating mechanism can be provided on the panel such as alarm lights which indicate if a particular drop is above or below the desired weight for the particular drop. Similar functional lights can also be provided in the box 38 carried on the side of the chart recorders 54. The chart recorders 54 are provided for recording the weight of each drop of fibers being made by the weigh pans.

Figure 3:
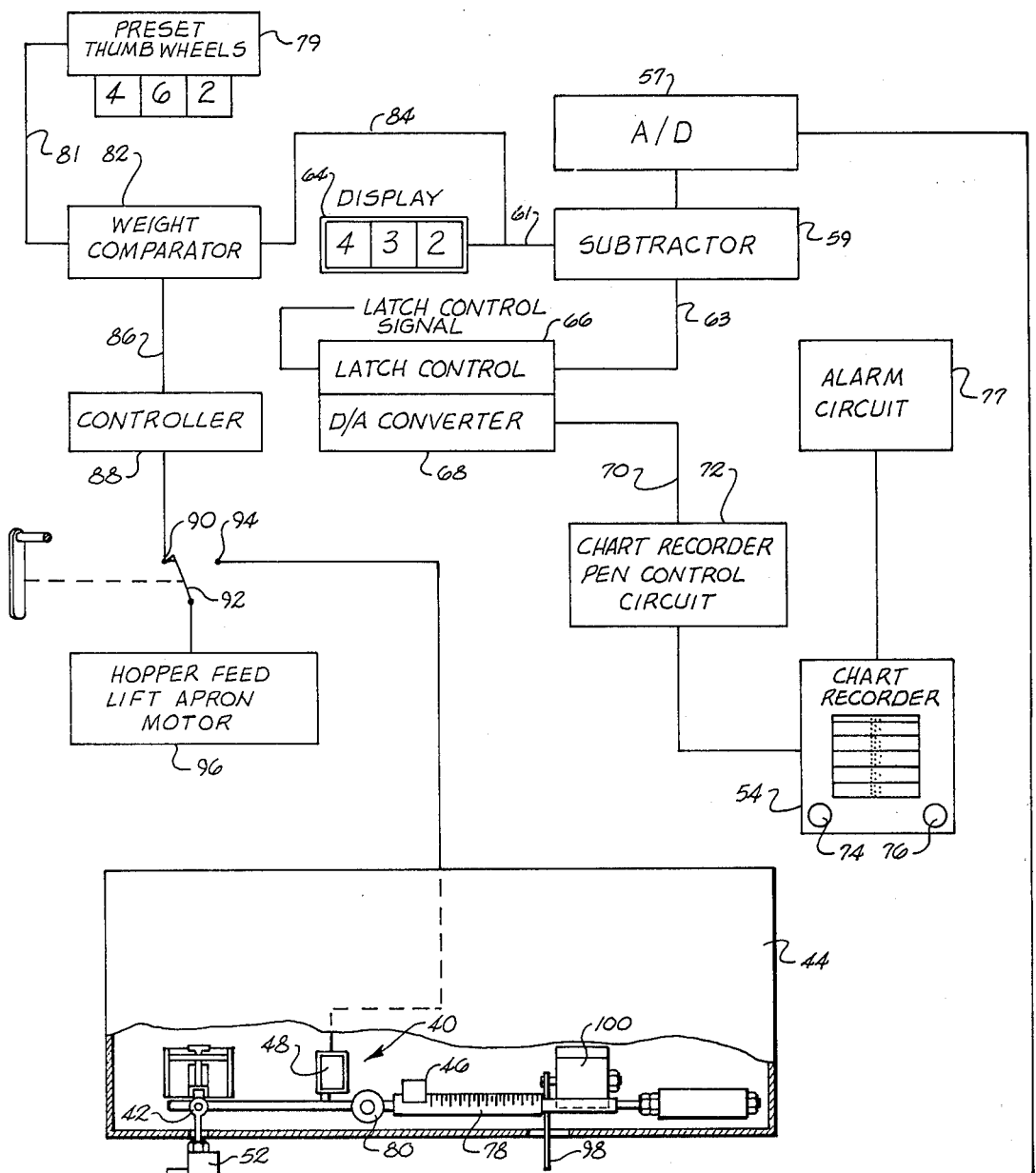
FIG. 3 is a side elevational view showing a portion of a weigh pan and hopper along with the controls for controlling filling of the weigh pan.

In FIG. 3, there is shown schematically a conventional hopper 44 equipped with a weigh bar assembly 40. One end of the weigh bar assembly is connected by means of rod 42 to a conventional weigh pan 22. The desired amount of fibers that are to be fed into the weigh pan 22 from the hopper 44 is set by manipulating the slide weight 46 carried on the weigh bar assembly 40. When the desired amount of fibers are filled into the weigh pan 22, the weigh bar assembly under normal operation will tilt allowing the left hand end to drop and de-energize switch 48. Upon de-energization of switch 48 in normal operation of the mechanically controlled system, a hopper feed lift apron motor 96 associated with the hopper 44 is de-energized stopping the feeding of fibers into the weigh pan.

The details of operation of the switch 48 and the hopper lift apron motor are given in U.S. Pat. No. 3,132,709.

Figure 2:
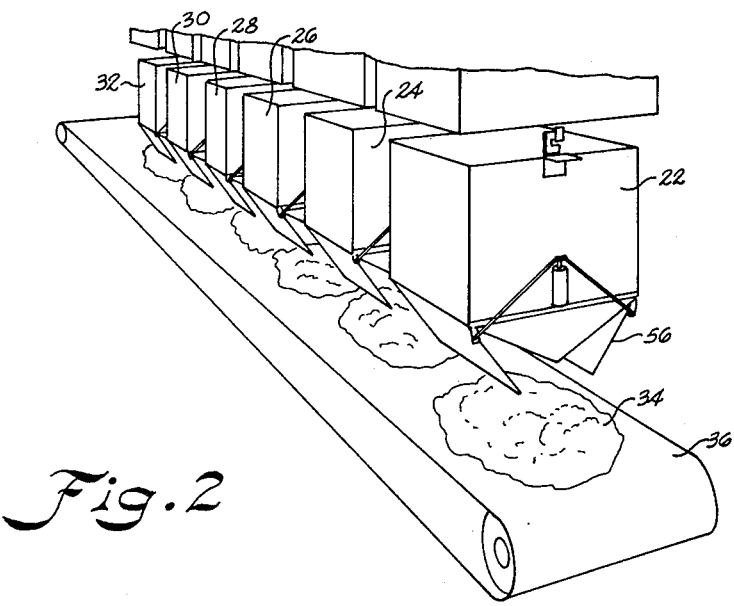
FIG. 2 is a perspective view illustrating conventional weigh pans dropping fibers on a conventional blending conveyor.

In order to accurately monitor the weight of each drop of fiber made by the mechanically operated system, a monitoring circuit such as disclosed in U.S. Pat. No. 4,310,060 was developed. This system utilized a load cell 52 that generated an electrical signal indicating the weight of the fibers fed into the weigh pan 22 and causes this weight to be recorded on a chart recorder 54 immediately prior to the fibers being dumped. In FIG. 2, doors 56 associated with the weigh pans are shown in the open position whereas in FIG. 3, the doors 56 are shown in the closed position. The doors 56 are opened and closed by manipulating a pneumatically operated cylinder 58 which has a piston connected to pivot arms 60. The doors 56, in turn, pivot about pivot points 62 during the opening and closing operation.

Going back to the operation of the monitoring system, the load cell 52 generates an electrical signal indicating in the form of an analog signal the gross weight of the particular weigh pan and fibers loaded therein. This signal is, in turn, fed to an analog-to-digital converter 57 which converts the signal into a composite digital signal. A subtractor 59 is connected to the output of the analog-to-digital converter 57 for subtracting the weight pan from the digital signal. The subtractor 59 has a pair of output leads 61 and 63. Output lead 61 is fed directly to a display panel 64 which visually displays the net weight of the fibers being loaded into the weigh pan in ounces and tenths of ounces.

The digital signals appearing on output leads 61 and 63 change constantly as the fibers are being loaded into the weigh pan and the reading produced by the digital display 64 varies accordingly. In order to produce a permanent record of the weight of the fibers dropped each time the doors are opened and drop fibers onto a conveyor, an additional control circuit is used to which the output lead 63 is connected. The digital signal representing the net fibers appearing on lead 63 is fed to a latch control circuit 66. When all of the weigh pans have been loaded with a predetermined weight of fibers, a signal is produced by the conventional circuitry associated with the weigh pans indicating that all of the weigh pans are ready to drop. After a short delay built into the circuit, all of the weigh pans drop the fibers onto the conveyor 36 simultaneously. This signal is used as a latch control signal for triggering the latch control circuit 66. Upon triggering of the latch control circuit 66, the digital reading that is supplied thereto is latched or stored into the circuit. This represents the net weight of fibers being dropped by a particular weigh pan. A digital to analog converter 68 is connected to the latch control circuit 66 for converting the digital signal latched therein back to an analog signal. The analog signal produced by the digital-to-analog converter 68 is fed out over lead 70 to a chart recorder pen control circuit 72. According to the amplitude of this analog signal, the pen associated with the chart recorder 54 is deflected and records the weight of the drop in the form of a mark on the chart paper.

The chart recorder is a conventional chart recorder provided with adjustable knobs 74 and 76. These knobs are utilized for setting the maximum and minimum tolerances allowed for each drop. If the weight of the fibers dropped is below the minimum setting of knob 74 or above the maximum setting of knob 76, then a respective lamp is illuminated and an alarm is activated by an alarm circuit 77. When the alarm circuit is activated, a lamp normally carried on control panel is illuminated and an alarm relay is energized.

As previously mentioned, when it is desired to mechanically control the filling and dropping of fibers by the weigh pans 22, the slide weight 46 is moved along a slide bar 78 until the desired weight is determined. The slide bar 78 can pivot about pivot member 80 and upon the feed hopper 44 depositing a predetermined amount by weight of fibers into the weigh pan 22 corresponding to the setting on the slide weigh bar assembly, the pivot arm 78 pivots de-energizing switch 48 which is associated with the hopper feed lift apron motor.

While in many applications, the mechanical control feeding and dropping of fiber works satisfactorily, it has been found that electrically measuring and controlling the operation of the weigh pan through the use of load cells is more accurate.

In the electrical system, the desired amount of fibers that are to be filled in a particular weigh pan is manually set in an electrical switch that may be any suitable switch that can be manually set such as thumbwheel switch 79. This thumbwheel switch 79 generates an electrical signal that is fed over lead 81 to a weight comparator 82. The weight comparator has another imput which receives a signal from the subtractor 59 over lead 84 which represents the actual weight of the fibers in the weigh pan. The signal representing the actual weight of fibers in the weigh pan is compared with the signal representing the desired weight of fibers and the comparator generates a control signal on lead 86. This control signal is, in turn, fed to a controller 88. The output of the controller 88 is connected to one terminal 90 of a manually operated microswitch 92. The microswitch 92 can be selectively moved from terminal 90 to 94. As can be seen, terminal 94 is connected to the electrical switch 48 associated with the mechanical weigh bar assembly 40. When the microswitch is in a position so that there is connection with terminal 94 the system operates in the conventional manner associated with the electromechanical weighing and dumping of fibers. In order to disengage the weigh bar assembly 40, the microswitch 92 is shifted to the left wherein it is in contact with terminal 90, and the output signal from controller 88 controls the operation of the hopper feed lift apron motor 96.

Therefore, as long as the signal coming into the weight comparator over lead 84 representing the actual weight of the fibers in the weigh pan 22 is less than the signal dialed in the thumbwheel switches 79, the hopper feed lift motor will continue to feed fibers into the weigh pan. When the desired weight is equal to the actual weight, the controller 88 produces a signal deenergizing the hopper feed lift apron motor in the same manner as the switch 48 associated with the weigh bar system.

Figure 4:
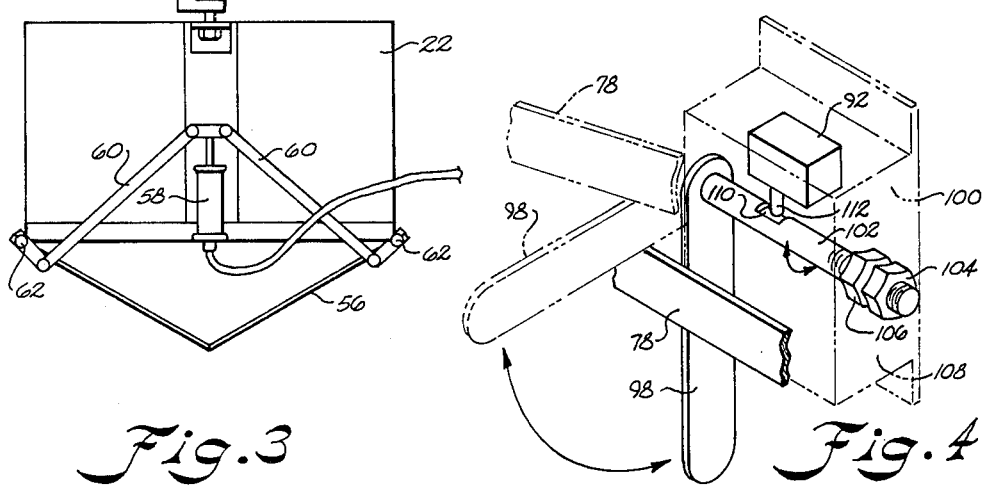
FIG. 4 is a perspective view illustrating a mechanism for disengaging a weigh bar system associated with a weigh bar assembly.

The means for disengaging the weigh bar system (FIG. 4) includes a pivotal arm 98 which is carried in a housing 100 provided on the side of the hopper. The arm 98 is connected directly to a shaft 102 which extends through the housing 100. On the other end of the shaft are two friction nuts 104 and 106 which are carried on opposed sides of the wall 108 of the housing. As a result, the handle 98 has to be physically rotated and because of the frictional contact of the nuts 104 and 106 with the side wall remains in this position and is capable of holding the weigh bar 78 in a raised position such as shown in FIG. 4 disengaging it completely from the circuit. It is also noted that the shaft 102 has a slot 110 provided therein. This slot 110 receives a plunger 112 of the switch 92. When the arm 98 is raised to the phantom line position shown in FIG. 4, it lifts the weigh bar 78 physically upward eliminating its operation from the circuit. Simultaneously, with the raising of the arm 98, the shaft 102 is rotated causing the plunger 112 associated with the switch 92 to shift from terminal 94 to 90 thus placing the electrical weighing system in action. As a result by visually examining the position of the arm 98, it can be determined whether the mode of operation of the system is electromechanical or purely electrical.

While a preferred embodiment of the invention has been described using specific terms, such description is for illustrative purposes only, and it is to be understood that changes and variations may be made without departing from the spirit or scope of the following claims.

What is claimed is:

1. An apparatus for selecting between mechanical and electrical modes of controlling the flow of fibers being fed by motor driven feed lift apron from a plurality of hoppers to a plurality of weigh pans for producing a predetermined blend of fibers, a balance arm assembly for mechanically setting a predetermined weight of fibers to be fed from a respective hopper to a respective weigh pan and a load cell for electrically monitoring the respective dumps of fibers from said weigh pans onto a conveyor, said apparatus comprising:

means for deactivating said balance arm assembly;

means connected to said load cells for generating an electrical signal corresponding to the actual weight of fibers being fed into said weigh pans;

means for setting a desired weight of fibers for each weigh pan and generating electrical signals representing the desired weight of fibers to be deposited on each cycle into said weigh pans:

a comparator means for comparing said signals corresponding to the actual weight of fibers in a weigh pan with said signal representing said desired weight of fibers for said weigh pan and generating a control signal responsive thereto; and means for supplying said control signal to said motor driven feed lift apron for filling said weigh pan with fibers until the actual weight of fibers deposited in a respective weigh pan equals the desired weight of fibers for said weigh pan.

2. The apparatus as set forth in claim 1 further comprising:

said means for deactivating said balance arm assembly including, a rotatable mounted crank arm carried adjacent said balance arm assembly for physically locking said balance arm in an inoperative position when rotated to a first position.

3. The apparatus as set forth in claim 2 further comprising:

switch means activated by said rotatable mounted crank arm for selectively providing electrical connection between said comparator means and said hopper feed lift apron motor.

4. An apparatus for controlling the flow of fibers from a hopper by means of a motor driven feed lift apron and depositing a predetermined amount of fibers by weight into a weigh pan, a mechanically operated balance arm weighing mechanism provided on said weigh pan for weighing the fibers being deposited into said weigh pan, an electrical switch being activated upon a predetermined weight of fibers being deposited in said weigh pan as measured by said balance arm weighing mechanism and a load cell carried on said weigh pan generating a signal indicating the weight of fibers being deposited in said weigh pan, said apparatus comprising:

an electrically operated weigh control circuit;

means for selectively deactivating said mechanically operated balance arm and said electrical switch and activating said electrically-operated weigh control circuit;

said electrically operated weigh control circuit including;

(i) means for setting a desired weight of fibers for said weigh pan and generating an electrical signal representing the desired weight of fibers to be deposited in said weigh pan;

(ii) a comparator means for comparing said signal corresponding to the actual weight of fibers in said weigh pan with said signal representing said desired weight of fibers for said weigh pan and generating a control signal responsive thereto; and (iii) means for supplying said control signal to a motor driven feed lift apron for filling said weigh pan with fibers until the acutual weight of fibers deposited in said weigh pan equals the desired weight of fibers for said weigh pan.

* * * * *